United States Patent [19]
Sainthuile et al.

[11] Patent Number: 6,061,612
[45] Date of Patent: May 9, 2000

[54] AIRCRAFT FLIGHT MANAGEMENT SYSTEM

[75] Inventors: Gérard Sainthuile, Orsay; Myriam Perennec, St Gregoire, both of France

[73] Assignee: Sextant Avionique, Velizy Villacoublay, France

[21] Appl. No.: 09/147,385

[22] PCT Filed: Jun. 13, 1997

[86] PCT No.: PCT/FR97/01077

§ 371 Date: Apr. 9, 1999

§ 102(e) Date: Apr. 9, 1999

[87] PCT Pub. No.: WO97/48028

PCT Pub. Date: Dec. 18, 1997

[30] Foreign Application Priority Data

Jun. 14, 1996 [FR] France ................................ 96 07420

[51] Int. Cl.$^7$ ............................................. G06F 7/00
[52] U.S. Cl. ..................... 701/7; 701/14; 701/121; 701/204; 340/949; 340/968; 73/178 R; 244/11
[58] Field of Search .................... 701/7, 10, 14, 701/121, 204, 206; 244/182, 203, 11; 73/178 R, 1.78, 178 T; 340/949, 968, 969

[56] References Cited

U.S. PATENT DOCUMENTS

| | | | |
|---|---|---|---|
| 5,445,021 | 8/1995 | Cattoen et al. | 73/178 R |
| 5,457,634 | 10/1995 | Chakravarty | 701/3 |
| 5,508,928 | 4/1996 | Tran | 701/3 |

Primary Examiner—William A. Cuchlinski, Jr.
Assistant Examiner—Yonel Beaulieu
Attorney, Agent, or Firm—Oblon, Spivak, McClelland, Maier & Neustadt, P.C.

[57] ABSTRACT

A process for managing air speed of an aircraft in flight. The method includes a first step of determining a point on the flight path at which it is theoretically possible to comply with a required time constraint by following a pre-established speed profile. In a second step, a speed is computed and a fresh speed profile is determined. This is obtained by determining speed corrections segment-by-segment from the point up to the last modifiable segment. The speed change in each segment is restricted to a maximum value. The new speed is computed on the basis of the curve showing the flight time t as a function of the speed V. This curve is approximated by a curve satisfying an equation with three coefficients ($C_1$, $C_2$, $C_3$):

$$V = c_1/t + c_2/t^2 + c_3/t^3$$

Compliance with time constraints are ensured by this method while meeting the requirements of the pilot and air traffic controllers.

17 Claims, 2 Drawing Sheets

AIRCRAFT FLIGHT MANAGEMENT SYSTEM

BACKGROUND OF THE INVENTION

1. Field of the Invention

The present invention relates to a process for managing air speed with a view to complying with the time constraints of an aerodyne in an unsettled meteorological environment.

2. Discussion of the Background

In general, it is known that the current trend is for the flight management systems of aerodynes to be ever more intimately incorporated into the air traffic management mechanisms, by involving digital ground/on-board communication means, more accurate locating means and more powerful computing means on the ground. Furthermore, these aerodynes carry on-board equipment which makes it possible to take into account ever more reliable and accurate meteorological forecasts. It therefore becomes possible to improve compliance with time constraints and therefore to reduce the admissible time windows associated with these constraints.

Furthermore, the strategy for the time constraints is different for each of the partners of the air transport.

Customarily, the pilot desires to manage these constraints as flexibly as possible (perhaps avoiding them) while taking into account the inaccuracy in the weather forecasts. In fact, he wants to avoid large variations in aircraft speed and engine revs for reasons of aircraft performance and engine lifetime.

For his part, the air traffic controller desires that the time constraints be managed as far upstream as possible of the flights so as to benefit from extra distance in order to cope with the time constraint by reducing (or increasing) the aircraft speed whilst leaving the aircraft on its path. In fact, the air traffic controller prefers to give instructions regarding time of transit as early as possible during the cruising segment. Thus, the traffic flows as forecast without creating additional conflicts.

It turns out that in spite of the abovementioned means, possible causes of error remain, especially in the realm of meteorological forecasts, which may lead to non-compliance with the time constraints.

SUMMARY OF THE INVENTION

The purpose of the invention is therefore a management process which makes it possible, through a straightforward mechanism, to counterbalance these (residual) errors in such a way as to guarantee compliance with the time constraints whilst nevertheless remaining consistent with the aspirations of pilots and air traffic controllers.

According to the invention, this process comprises at least two successive phases, namely:

- a first phase consisting in determining a possible point of the path, onwards of which, theoretically, it becomes materially impossible to keep to the time constraint requested by following the previously scheduled speed profile, and where it becomes necessary to alter this speed profile over the portion of path remaining to be performed, and
- a second phase comprising the computation of a change of speed value and the determination of a new speed profile over the portion of path remaining to be performed with a view to complying with the constraint, this portion of path comprising segments and this new profile being obtained by determining segment-by-segment speed corrections starting from the aforementioned point and up to the last modifiable segment, the speed variation in each of the segments being limited to a maximum value so as to avoid overly large variations in speed with respect to the optimal speed, and this second phase comprising the computation of the new speed over a given segment starts from the curve giving the time of flight t as a function of the speed V, this curve being represented by an approximate curve satisfying an equation with three coefficients $c_1$, $c_2$ and $C_3$:

$$V = c_1/t + c_2/t^2 + c_3/t^3$$

and from the computation of the path for three different speeds so as to determine three times of flight and define three points of support of the curve, the computation of the new speed comprising the following steps:

- the determination of the coefficients $c_1$, $c_2$ and $c_3$, such that the approximate curve passes through the three points of support
- the determination, with the aid of this equation, of an approximate value $Vapp_1$ of the speed so as to satisfy the constrained time of flight tcstr $$(Vapp_1 = c_1/tcstr + C_2/tcstr^2 + c_3/tcstr^3),$$

- the determination of a new time of flight $tapp_1$ by computing the path for the approximate value of the speed,
- the incorporation of the approximate speed as the new speed if the time of flight determined is sufficiently close to the constrained time tcstr,
- the repetition of the above steps, each time using the three points of support closest to the constrained time (from among the time of flight values which were previously supplied by the path computations) for as long as the time of flight determined is too far from the constrained time tcstr.

The invention also consists in apportioning the necessary speed variation over several segments in the case in which this necessary speed variation exceeds the fixed limits.

With a view to computing the instant and the position of the change of speed point, as well as the value of this change of speed, the invention is based on the following relations:

$$\vec{V}\text{true} = \vec{V}\text{gnd} - \vec{V}w \qquad 1).$$

in which:

$\vec{V}$ true is the true air speed $\vec{V}$ gnd is the ground speed $\vec{V}$ w is the wind speed $$Vgnd = Vtrueguid \times \cos(\chi - \psi) + Vwlongpred \qquad 2).$$

in which:

Vtrueguid is the aircraft's true guidance air speed $\chi$ is the course angle $\psi$ is the heading Vwlongpred is the predicted wind speed along the path $$abs(Vtrueguid - Vtrueprm) < X \times Vtrueprm \qquad 3).$$

in which:

Vtrueprm is the minimum cost true speed

X is a predetermined percentage

Furthermore, in the straightforward case of a single cruising level with a constant scheduled air speed over this level, when a time constraint Trta situated at a point of the path having a position Posrta is taken into account by the navigation system, this constraint causes the minimum cost true speed Vtrueprm to be changed from the current position Poscurrent up to the position of the constraint Posrta, by a percentage X' such that the distance $D_{(Posrta-Poscurrent)}$ between the current position and the position of the constraint satisfies the following relation:

$$D_{(Posrta-Poscurrent)} = \int_{Tcurrent}^{Trta} ((Vtrueprm \times (1 + X') \times \cos(\chi - \psi) + Vwlongpred)) \times dt$$

with:

$$X' = -(Tcstr - Teff)/Teff,$$

Teff being the initial minimum cost time of flight from the current position up to the time constraint Tcstr being the time-constrained time of flight from the current position up to the time constraint and $$abs(X') < abs(X)$$

so as to stray as little as possible from the economical path whilst remaining at constant air speed, this being only a slight perturbation relative to the unconstrained path.

At an instant Tcurrent after beginning to take into account, at the moment Tdep, the time constraint Trta, the distance D*, between the position Posdep at which the time constraint starts to be taken into account and the position of the constraint Posrta, is split up as follows, while accounting for the weather prediction errors over the journey already travelled.

$$D^* = \int_{Tdep}^{Tcurrent} ((Vtrueprm \times (1 + X') \times \cos(\chi - \psi) + dVwlongpred + Vwlongpred)) \times dt + \int_{Tcurrent}^{Trta} ((Vtrueprm \times (1 + X') \times \cos(\chi - \psi) + Vwlongpred)) \times dt$$

Since, by definition, this distance is constant, this signifies that at the moment of the time constraint Trta, the position of the aerodyne will be shifted with respect to the position of the time constraint by a distance D equal to $$D^{} = \int_{Tdep}^{Tcurrent} dVwlongpred \times dt$$

In the case in which the absolute value of this distance D** is greater than or equal to the distance D(dTrta) corresponding to the tolerance on the time constraint dTrta, i.e.:

$$abs(D^{**}) \geq \int_{Trta-dTrta}^{Trta} Vtrueprm \times (1 + X') \times \cos(\chi - \psi) \times dt$$

$$= D(dTrta)$$

compliance with the time constraint Trta is endangered.

It therefore becomes necessary to adjust the speed over the remaining journey by choosing a percentage X" in such a way that the distance between the position of this new change of speed Poschgspd, corresponding to the moment Tchgspd, and the position Posrta of the time constraint Trta is given by the following formula:

$$D_{(Posrta-Poschgspd)} = \int_{Tchgspd}^{Trta} ((Vtrueprm \times (1 + X') \times \cos(\chi - \psi) + Vwlongpred)) \times dt$$

with $$(X'' - X') \times \left( \int_{Tchgspd}^{Trta} Vtrueprm \times \cos(\chi - \psi) \times dt \right) = -\int_{Tdep}^{Tchgspd} dVwlongpred \times dt$$

i.e.

$$X'' = X' - \left( D(dTrta) \int_{Tchgspd}^{Trta} Vtrueprm \times \cos(\chi - \psi) \times dt \right)$$

Thus, in the event of stronger headwinds than forecast, the new cruising speed will be greater than the previous one (X">X').

Implicitly, the objective here is to arrive at the position of the constraint Posrta exactly at the moment of the time constraint Trta. In fact, it is assumed that the weather prediction errors over the remainder of the journey are zero.

At less than a certain distance from the place of the time constraint, the change of speed is no longer called for. This distance is such that the wind prediction error over the remaining journey may not prevent compliance with the time constraint. This distance, termed the minimum distance Dmin, can be estimated through the formula:

$$Dmin = Vtrueprm^2 \times dTrta/dVwlongpred \text{ max}$$

Customarily, this distance is of the order of 150 NM with a time tolerance on the time constraint (dTrta) of 30 s, a minimum cost true air speed (Vtrueprm) of 450 knots, and a discrepancy between the actual wind and the wind predicted along the path (dvwlongpred) of 10 knots.

In the case in which the flight plan includes several levels of cruising flight, a partially speed-constrained speed profile with prescribed heights over certain segments as well as descent time constraints, the above reasoning remains valid, provided the idea of average speed is used.

This concept of average speed signifies that the true air speed is modified over all the segments of the path (up to the time constraint), where it is modifiable by a certain percentage X" in such a way as to comply overall with the instant of transit over the time-constrained point. By way of example, an expression for this average speed Vgndavg as a function of X" and of the true speed initially scheduled over each segment Vtruesegi (between the position of the change of speed poschgspd and the position of the time constraint poscstr) is given below:

$$Vgndavg = \left((1+X'') \times \left(\sum_{poschgspd}^{poscstr} Vtruesegi \times \cos(\chi - \psi) \times Dsegi\right)\right) +$$

$$\sum_{poschgspd}^{poscstr} Vwlongpredi \times Dsegi / D_{posrcstr-poschgspd}$$

with:

$X''=X'-(d\text{Trta}/T_{poscstr\text{-}poschgspd})$ $X'=-(T\text{rta}-T\text{prm})/T\text{prm}$ Dsegi being the distance from segment i Vtruesegi being the true speed over segment i Vwlongpredi being the predicted wind speed over segment i $T_{poscstr\text{-}poschgspd}$ being the time discrepancy between the moment of change of speed and the time constraint $D_{poscstr\text{-}Poschgspd}$ being the distance to be travelled between the position of the change of speed and the position of the time constraint Tprm being the time of flight

BRIEF DESCRIPTION OF THE DRAWINGS

A mode of organization of the real-time procedure for computing or for recomputing the vertical profile of a flight plan, so as to comply with a time constraint, will be described below with reference to the appended drawings in which.

DETAILED DESCRIPTION OF THE PREFERRED EMBODIMENTS

Figure 1:
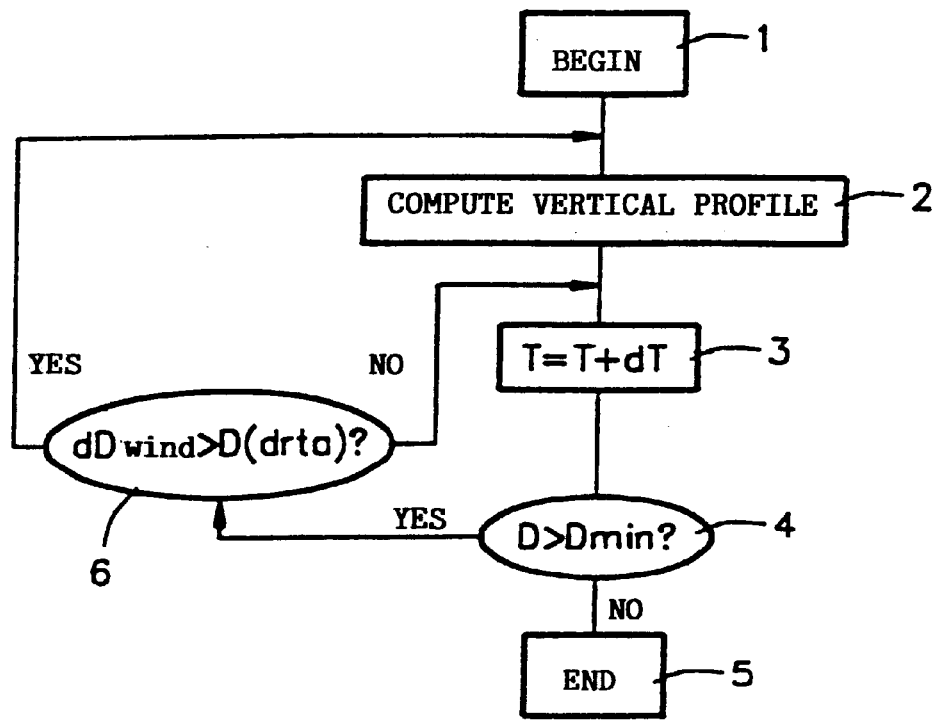
FIG. 1 is a flowchart illustrating the general principle of this organization.

In the example illustrated in FIG. 1, this procedure comprises, initially, starting from begin indicated by block 1, a step of computing the vertical profile of a flight plan making it possible to comply with a constraint (block 2). Starting from the instant T at which this profile has been computed, it counts the time (block 3) until a time increment dT has been reached (instant T+dT).

At this instant, it computes the distance D from the aerodyne to the constrained point and compares it with a minimum distance Dmin below which the constraint can be complied with (block 4). If the distance D is less than or equal to the minimum distance Dmin, then the process is interrupted (end block 5).

On the other hand, if the distance D between the current position of the aerodyne and the position of the time constraint is greater than the minimum distance Dmin, the process compares the discrepancy in distance due to the wind dDwind with the tolerance on the distance linked with the time constraint D(drta) (block 6).

The tolerance D(drta) on the distance to the constrained point is the distance discrepancy accepted on arrival at the constrained point, acceptance corresponding to the tolerated discrepancy drta between the time of arrival at the constrained point and the value of the prescribed time constraint.

The discrepancy due to the wind dDwind is a discrepancy between the current position of the aerodyne and the position which this same aerodyne ought to have had at the same moment with the latest vertical profile used and in the absence of prediction errors.

If the discrepancy dDwind is greater than D(drta) the process loops back to the input of block 2 to initiate a new vertical profile computation and then execute a new cycle.

On the other hand, if the discrepancy dDwind is not greater than D(drta) the process loops back at the output of block 2 so as to execute steps 3, 4, 5 or 6 using the same vertical profile.

Naturally, the computation of the vertical profile executed in block 2 must culminate in a profile which makes it possible both to comply initially with the time constraint and subsequently to absorb the time discrepancy noted.

Figure 2:
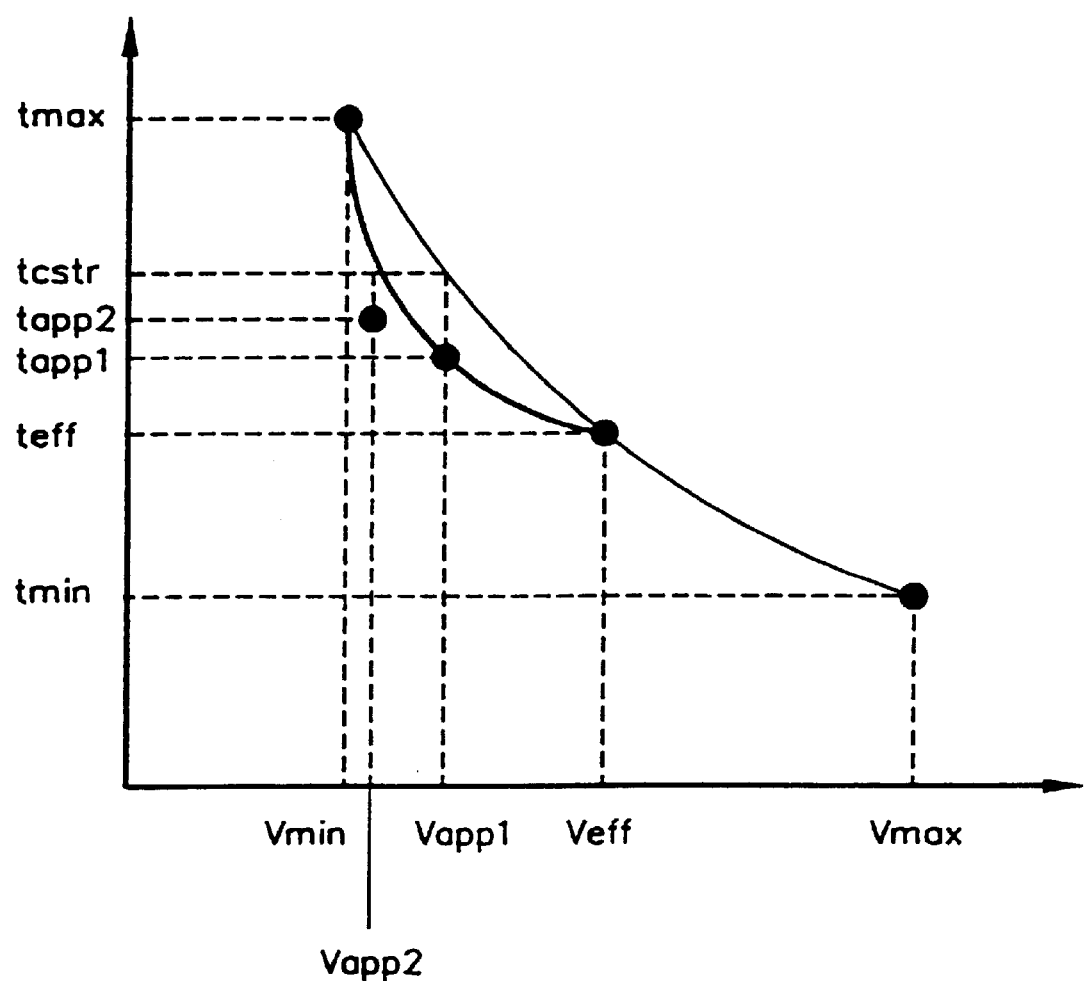
FIG. 2 is a graph representing the time of arrival of an aerodyne as a function of its speed over a segment, this graph illustrating the principle of a speed search for satisfying a time constraint situated downstream of this segment.

This computation is based on the method of determining speed over a segment at constant calibrated air speed (CAS) or at constant MACH number, illustrated for example by the curve represented in FIG. 2 which gives the time to the constrained point as a function of speed.

The curve which gives the time of flight to the constrained point as a function of speed is modelled by an approximate curve with a simple mathematical expression.

The equation of this approximate curve is for example:

$$V = c_1/t + c_2/t^2 + c_3/t^3$$

The coefficients $c_1$, $c_2$ and $c_3$ being obtained by solving the matrix equation:

$$\begin{pmatrix} Vmin \\ Veff \\ Vmax \end{pmatrix} = \begin{pmatrix} 1/tmax & 1/tmax^2 & 1/tmax^3 \\ 1/teff & 1/teff^2 & 1/teff^3 \\ 1/tmin & 1/tmin^2 & 1/tmin^3 \end{pmatrix} \begin{pmatrix} c_1 \\ c_2 \\ c_3 \end{pmatrix}$$

It is clear that the approximate curve can be determined from this matrix equation by knowing three particular points present on the curve, these three points of support possibly being the points corresponding respectively to the following pairs of values of speed and time of flight:

(Veff, teff), (Vmin, tmax) and (Vmax, tmin),

Veff being the operational speed teff being the effective time of flight using the effective speed profile Vmin being the minimum speed tmax being the maximum time using the minimum speed profile Vmax being the maximum speed tmin being the minimum time using the maximum speed profile.

The various times of flight can be computed by performing simulations of the path of the aerodyne each corresponding to a prescribed speed profile.

When the equation of the approximate curve is defined, it is possible rapidly to ascertain an approximate value of the speed $Vapp_1$ so as to satisfy the time constraint tcstr.

This is the speed of the point of the approximate curve, defined by the value of the time constraint tcstr. In the illustrative approximate curve proposed above, the speed $Vapp_1$ is expressed according to the following expression $Vapp_1 = c_1/tcstr + c_2/tcstr^2 + c_3/tcstr^3$ Next, by generating a computation of the path, a new time of flight to the constrained point ($tapp_1$) is obtained. If this time obtained $tapp_1$ is sufficiently close to the constrained time tcstr, the computation halts and the speed thus determined is confirmed for the new profile, otherwise the computations are repeated, each time computing a new approximate curve with the values closest to the constrained time, from among the time of flight values which were previously supplied by the path computations, for as long as the time of flight determined is too far from the constrained time tcstr (during the first iteration, the values available are those corresponding to the times tmin, teff, tmax and $tapp_1$).

Figure 3:
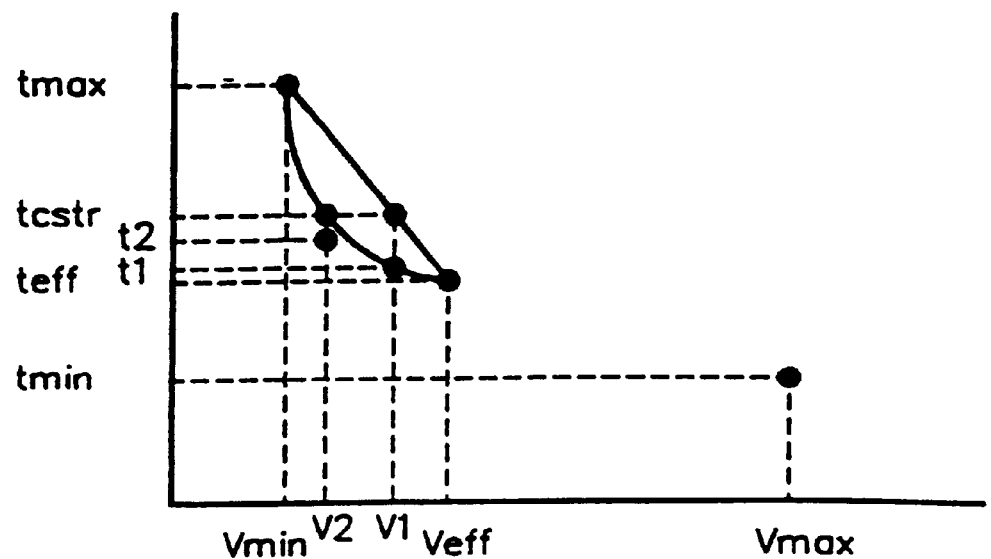
FIG. 3 is a graph similar to that of FIG. 2 which illustrates the principle of an accelerated search for the speed.

As indicated in FIG. 3, the search can be accelerated by taking (Vmin, Veff) as speed search interval in the case where teff<tcstr<tmax and the interval (Veff, Vmax) in the case where tmin<tcstr<teff. The third point necessary for computing the curve is obtained by performing a linear interpolation comprising the following two stages of computation:

First Stage of Computation

Assuming that teff<tcstr<tmax, the speed $V_1$ is computed by interpolation for tcstr between (Vmin, tmax) and (Veff, teff), thus for example for a linear interpolation $V_1$ is expressed by the following relation $V_1 = Vmin + (Veff - Vmin) \times (tmax - tcstr)/(tmax - teff)$ After having computed the path for this new speed profile, it is then possible to determine the time of arrival $t_1$ at the constrained point.

In the case in which the time determined is sufficiently close to the time of flight which complies with the constraint, for example when the discrepancy $|t_1 - tcstr|$ is less than a value $\epsilon$, this new speed is taken into account for the new speed profile.

In the case in which the time determined does not correspond to a fairly accurate approximation of the constrained time, for example when this discrepancy $|t_1 - tcstr|$ is greater than the value $\epsilon$, the following second stage of computation is entered:

Second Stage of Computation

The curve with equation $V = c_1/t + c_2/t^2 + c_3/t^3$ passing through the three points of support (Vmin, tmax), ($V_1$, $t_1$) and (Veff, teff) is determined.

This curve represents an approximation to the curve connecting the speed with the time of travel.

Next, from this is deduced a speed value $V_2$ which is an approximate value of the speed satisfying the time constraint tcstr, such that $V_2 = c_1/tcstr + c_2/tcstr^2 + c_3/tcstr^3$ A new path is then computed which makes it possible to determine the time $t_2$ of flight to the constrained point.

In the case in which the time determined $t_2$ is not fairly near the constrained time, for example when the discrepancy $|t_2 - tcstr|$ is greater than the value $\epsilon$, a new equation is sought for the curve with the three points closest to tcstr from among (Vmin, tmax), ($V_1$, $t_1$), ($V_2$, $t_2$) and (Veff, teff) (three points of support arising from the previous path computations allowing the computation of three new coefficients $c_1$, $c_2$ and $c_3$) and so on and so forth if necessary up to rank n.

Naturally, the speed value V adopted will be that which makes it possible to reduce the discrepancy, in absolute value, between the latest determination of the time at the constraint point and the value of the time constraint $|t_n - tcstr|$ to an acceptable value, for example to a value less than the value $\epsilon$.

Stages of computations described above for searching over the interval (Vmin, Veff) are readily deduced from those for a speed search over some other interval such as for example the interval (Veff, Vmax) or the interval between Veff and a speed V0, corresponding to a time t0.

In the latter example, the computation of the speed rests on the points (Veff, teff) and (V0, t0) over which an interpolation enables a speed V1 to be computed.

As mentioned earlier, for the purpose of limiting the overly large variations in speed with respect to the optimal speed and of modulating the effort over several segments of the path, there is cause to limit the range of speed variation.

The general computation procedure is then as follows:

1) A speed interval [Vkmin, Vkmax] included within the flight envelope is fixed for each segment k with:

$Vkmin = (1 - \alpha max) \times Vkeff$ $Vkmax = (1 + \alpha max) \times Vkeff$

A vertical profile supplied to the aerodyne must comply with this new speed envelope about the optimal operational speed defined over each segment by Vkeff, corresponding to the time teff.

This speed interval represents the maximum variation in operational speed permitted by the airline.

2) There is determined either the coefficient $\alpha-$ such that $\alpha- < \alpha min$ or the coefficient $\alpha+$ such that $\alpha+ < \alpha max$, and such that the speed $Vk- = (1-\alpha-) \times Vkeff$ or the speed $Vk+ = (1+\alpha+) \times Vkeff$ bounds the variation in speed over each segment k.

For example, if teff<tcstr<tmax, only Vk− and hence $\alpha-$ is defined:

$\alpha- = (tcstr - teff)/(tcstr - tinit) + \Delta\alpha$ tinit corresponds to the first point onwards of which the speed is modifiable.

$\Delta\alpha$ is a value arbitrarily supplementing the approximations made.

tmax corresponds to the profile of the speeds Vkmin.

3) It is verified that it is actually possible to satisfy the time constraint with a speed profile lying within an envelope defined by a first profile, which is the profile Veff corresponding to the speeds Vkeff and a second profile which is, in the case where teff<tcstr, the profile $V\alpha-$ corresponding to the speeds Vk−, by performing a complete computation over the whole path with the speed profile $V\alpha-$ and by verifying that the times of arrival at the constrained point of the first and second profiles bracket the time constraint, otherwise it is necessary to redefine $\alpha-$ by acting on the supplement $\Delta\alpha$ (for example by doubling it or by giving it a new value greater than its previous value). In the case where teff<tcstr, the time constraint is certainly satisfiable if teff<tcstr<t$\alpha-$, where t$\alpha-$ is the time of arrival with the profile $V\alpha-$.

4) The algorithm for computing the speed profile, defined earlier, is then applied for example to the first segment, with the interval of speeds ($V\alpha-$, Veff) as input, i.e. for this example (V1−, V1eff), in such a way as to have an output speed profile Vcstr having the accuracy requested for compliance with the time constraint.

For example, in order to apportion the necessary speed variation over several segments in the case in which this necessary speed variation exceeds the fixed limits, the new speed profile (Vcstr) is computed segment by segment, the first segment is processed in such a way as to obtain on output a new speed profile comprising a speed (V1cstr) over the first segment and speeds (Vkeff) over the other segments k, which new profile complying with the time constraint with the accuracy requested, and in the case in which, for the segment k being processed, the modification of the speed, in the interval [Vk−, Vkeff] in the case where teff<tcstr and in the interval [Vkeff, Vk+] in the case where tcstr<teff, does not make it possible to define a new profile complying with the time constraint, the speed over the segment k being processed Vkcstr is fixed at Vk− in the case where teff<tcstr and at Vk+ in the case where tcstr<teff and a new speed is sought for the following segment in the search interval [V(k+1)−, V(k+1)eff] in the case where teff<tcstr and in the search interval [V(k+1)eff, V(k+1)+] in the case where tcstr<teff, so as to find a speed profile complying with the time constraint with the accuracy requested.

And, if tcstr<teff, the general computation procedure is readily deduced from that described for teff<tcstr, by defining α+ by analogy with α− and by continuing the computations with the speeds Vα+.

$$\alpha+=-(tcstr-teff)/(tcstr-tinit)+\Delta\alpha$$

This method makes it possible to avoid the overly large variations in speeds with respect to the operational speed which is optimal from a performance point of view.

When there are several time constraints, these are processed sequentially, from the closest to the furthest.

We claim:

1. A process for managing air speed in compliance with a time constraint of an aerodyne traveling a path in an unsettled meteorological environment, comprising:

determining a point of the path, onwards of which it becomes materially impossible to comply with the time constraint requested by following a previously scheduled speed profile, and where it becomes necessary to alter said previously speed profile over a remaining portion of the path remaining to be traveled; and determining a new speed profile for the remaining portion of the path complying with the constraint, by dividing the remaining portion of the path in segments and determining segment-by-segment speed corrections starting from said point and up to a last modifiable segment, a speed variation in each of the segments being limited to a maximum value so as to avoid overly large variations in speed with respect to an optimal speed, wherein determining the new speed profile comprises determining a new speed over a given segment by:

a) approximating a curve, giving the time of flight t as a function of speed V, with an equation with three coefficients $c_1$, $c_2$ and $c_3$:

$$V=c_1/t+c_2/t^2+c_3/t^3,$$

b) determining the coefficients $c_1$, $c_2$ and $c_3$, such that the curve passes through three points of support, c) calculating an approximate value $Vapp_1$, of the new speed, satisfying the constrained time of flight tcstr, with:

$$(Vapp_1=c_1/tcstr+c_2/tcstr^2+c_3/tcstr^3),$$

d) determining a new time of flight $tapp_1$ by computing the path for the approximate value of the new speed, e) incorporating the approximate value of the new speed as the new speed if the new time of flight $tapp_1$ determined is sufficiently close to the constrained time tcstr, and f) repeating b) through e), each time using the three points of support closest to the constrained time tcstr for as long as the new time of flight $tapp_1$ determined is too far from the constrained time tcstr.

2. The process according to claim 1, wherein if the constrained time tcstr lies between an effective time of flight teff corresponding to an effective speed Veff and a time t0 corresponding to a speed V0, determining the new speed is performed in an interval lying between the speed V0 and the effective speed Veff according to a computation sequence comprising:

g) estimating an approximate speed ($V_1$), corresponding to the constrained time tcstr, by linear interpolation between the points (V0, t0) and (Veff, teff), h) determining a new time of flight $t_1$ by computing the path for the approximate speed, i) incorporating the approximate speed as the new speed if the new time of flight determined is sufficiently close to the constrained time tcstr, j) defining the following three points of support (V0, t0), ($V_1$, $t_1$) and (Veff, teff) and repeating g) through i), if the new time of flight determined is not sufficiently close to the constrained time tcstr.

3. The process according to claim 2, wherein when teff<tcstr, the time t0 is the maximum time tmax corresponding to the speed V0, which is the minimum speed Vmin permitted.

4. The process according to claim 2, further comprising:

setting, for each segment of a speed interval included within a flight envelope, $$Vkmin=(1-\alpha min)\times Vkeff$$

$$Vkmax=(1+\alpha max)\times Vkeff$$

where Vkeff is the optimal speed over the segment k, determining either a coefficient α− or a coefficient α+ such that α−<αmin or α+<αmax and such that the variation in speed over each segment k is bounded by speeds Vk−=(1−α−)×Vkeff or Vk+=(1+α+)×Vkeff, wherein in the case where teff<tcstr, Vk− is defined by $$\alpha-=(tcstr-teff)/(tcstr-tinit)+\Delta\alpha,$$

and in the case where tcstr<teff, Vk+ is defined by $$\alpha+=-(tcstr-teff)/(tcstr-tinit)+\Delta\alpha,$$

where tinit is the moment of said change of speed and Δα is an arbitrary supplement, verifying that it is actually possible to satisfy the time constraint with a speed profile lying within an envelope defined by a first profile corresponding to the speeds Vkeff and a second profile which is either the profile corresponding to the speeds Vk− in the case where teff<tcstr, or the profile corresponding to the speeds Vk+ in the case where tcstr<teff, by computing the path for said second speed profile and by verifying that the times of arrival at the constrained point of the first and second profiles bracket the time constraint, and if such bracketing is not obtained, redefining the coefficient α− in the case where teff<tcstr and redefining the coefficient α+ in the case where tcstr<teff by choosing a new value Δα greater than the previous value and carrying out a new verification, determining, in the case where the constraint is satisfied, the new speed profile by using, for the processing of the first segment, the speed interval [V1−, V1eff] on entry of said corporation sequence, in such a way as to obtain a new speed profile (Vcstr) having the accuracy requested for compliance with the time constraint.

5. The process according to claim 4, comprising:

computing the new speed profile (Vcstr) segment by segment, and processing the first segment to obtain a new speed profile comprising a speed (V1cstr) over the first segment and speeds (Vkeff) over the other segments k, which new profile complies with the time constraint with the accuracy requested, wherein in the case where, for a segment k being processed, the modification of the speed, in the interval [Vk−, Vkeff] in the case where teff<tcstr and in the interval [Vkeff, Vk+] in the case where tcstr<teff, does not make it possible to define a new profile complying with the time constraint, the speed over the segment k being processed Vkcstr is fixed at Vk− in the case where teff<tcstr and at Vk+ in the case where tcstr<teff and a new speed is sought for the following segment in the search interval [V(k+1)−, V(k+1)eff] in the case where teff<tcstr and in the search interval [V(k+1)eff, V(k+1)+] in the case where tcstr<teff, so as to find a speed profile complying with the time constraint with the accuracy requested.

6. The process according to claim 1, comprising:

processing several time constraints sequentially, from the closest to the furthest.

7. The process according to claim 1, wherein the step of determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance travelled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

8. The process according to claim 3, further comprising:

setting, for each segment of a speed interval included within a flight envelope, $V k \min =(1-\alpha \min ) \times V k \mathrm{eff}$ $V k \max =(1+\alpha \max ) \times V k \mathrm{eff}$ where Vkeff is the optimal speed over the segment k, determining either a coefficient $\alpha-$ or a coefficient $\alpha+$ such that $\alpha-<\alpha \min$ or $\alpha+<\alpha \max$ and such that the variation in speed over each segment k is bounded by speeds $V k-=(1-\alpha-) \times V k \mathrm{eff}$ or $V k+=(1+\alpha+) \times V k \mathrm{eff}$, wherein in the case where teff<tcstr, Vk− is defined by $\alpha-=(t \mathrm{cstr}-t \mathrm{eff}) /(t \mathrm{cstr}-t \mathrm{init})+\Delta \alpha$, and in the case where tcstr<teff, Vk+ is defined by $\alpha+=-(t \mathrm{cstr}-t \mathrm{eff}) /(t \mathrm{cstr}-t \mathrm{init})+\Delta \alpha$, where tinit is the moment of said change of speed and $\Delta \alpha$ is an arbitrary supplement, verifying that it is actually possible to satisfy the time constraint with a speed profile lying within an envelope defined by a first profile corresponding to the speeds Vkeff and a second profile which is either the profile corresponding to the speeds Vk− in the case where teff<tcstr, or the profile corresponding to the speeds Vk+ in the case where tcstr<teff, by computing the path for said second speed profile and by verifying that the times of arrival at the constrained point of the first and second profiles bracket the time constraint, and if such bracketing is not obtained, redefining the coefficient $\alpha-$ in the case where teff<tcstr and redefining the coefficient $\alpha+$ in the case where tcstr<teff by choosing a new value $\Delta \alpha$ greater than the previous value and carrying out a new verification, determining, in the case where the constraint is satisfied, the new speed profile by using, for the processing of the first segment, the speed interval on entry of said corporation sequence, in such a way as to obtain a new speed profile (Vcstr) having the accuracy requested for compliance with the time constraint.

9. The process according to claim 2, comprising:

processing several time constraints sequentially, from the closest to the furthest.

10. The process according to claim 3, comprising:

processing several time constraints sequentially, from the closest to the furthest.

11. The process according to claim 4, comprising:

processing several time constraints sequentially, from the closest to the furthest.

12. The process according to claim 5, comprising:

processing several time constraints sequentially, from the closest to the furthest.

13. The process according to claim 2, wherein the step of determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance traveled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

14. The process according to claim 3, wherein the step of determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance traveled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

15. The process according to claim 4, wherein determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance traveled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

16. The process according to claim 5, wherein the step of determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance traveled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

17. The process according to claim 6, wherein the step of determining said point of the path of the aerodyne onwards of which it becomes impossible to comply with the time constraint comprises:

determining a distance D which separates the position of said aerodyne at the current time from the position of the time constraint, in comparing said distance D with a minimum value Dmin, and when said distance D is greater than the minimum value Dmin, comparing the discrepancy in distance due to the wind dDwind with the tolerance on the distance linked with the time constraint D(drta), the discrepancy in distance due to the wind being the discrepancy between the distance traveled by the aerodyne since the last alteration of speed profile complying with the constraint and the distance which said aerodyne ought to have traveled since the last alteration of speed profile in the absence of errors in the prediction of the wind, said point of the path being that for which the discrepancy in distance due to the wind becomes greater than the tolerance linked with the time constraint.

* * * * *